United States Patent
Paris et al.

(10) Patent No.: US 10,634,529 B2
(45) Date of Patent: Apr. 28, 2020

(54) FLOW MEASURING DEVICE HAVING A DIFFUSER WITH PLURAL PASSAGES FOR DIRECTING FLOW TOWARD THE IMPELLER VANES

(71) Applicant: ELBI INTERNATIONAL S.p.A., Turin (IT)

(72) Inventors: Fabrizio Paris, Druento (IT); Paolo Ravedati, Moncalieri (IT); Maurizio Rendesi, Villarbasse (IT)

(73) Assignee: ELBI INTERNATIONAL S.p.A., Turin (IT)

( * ) Notice: Subject to any disclaimer, the term of this patent is extended or adjusted under 35 U.S.C. 154(b) by 0 days.

(21) Appl. No.: 16/068,768

(22) PCT Filed: Feb. 2, 2017

(86) PCT No.: PCT/IB2017/050559
§ 371 (c)(1),
(2) Date: Jul. 9, 2018

(87) PCT Pub. No.: WO2017/134590
PCT Pub. Date: Aug. 10, 2017

(65) Prior Publication Data
US 2019/0025098 A1    Jan. 24, 2019

(30) Foreign Application Priority Data
Feb. 5, 2016 (IT) .................. 102016000012017

(51) Int. Cl.
*G01F 1/075* (2006.01)

(52) U.S. Cl.
CPC ................................... *G01F 1/075* (2013.01)

(58) Field of Classification Search
None
See application file for complete search history.

(56) References Cited

FOREIGN PATENT DOCUMENTS

| CN | 2 443 343 Y | 8/2001 |
|---|---|---|
| CN | 201302497 Y | 9/2009 |
| CN | 102207397 A | 10/2011 |
| EP | 0 599 341 A2 | 3/2007 |
| WO | 2005/121714 A1 | 12/2005 |

OTHER PUBLICATIONS

International Search Report for PCT/IB2017/050559 dated Jun. 9, 2017 [PCT/ISA/210].

*Primary Examiner* — Harshad R Patel
(74) *Attorney, Agent, or Firm* — Sughrue Mion PLLC

(57) ABSTRACT

A device for measuring the flow rate includes an impeller rotatably mounted in a conduit about an axis, and a detector indicating the angular speed of the impeller. A diffuser has a plurality of passages for dividing the flow into reduced flows which are directed toward the vanes of the impeller to cause rotation. The diffuser forms peripheral passages which extend in planes parallel to the axis and inclined in a same direction about the axis. Each passage has a longitudinal inlet portion, parallel to the axis and a transverse outlet portion laterally facing a first axial portion of the impeller such that in operation, the outlet portions of the passages direct towards the vanes of the impeller corresponding flows or jets of fluid in non-radial directions inclined in a same direction around the axis.

11 Claims, 5 Drawing Sheets

FLOW MEASURING DEVICE HAVING A DIFFUSER WITH PLURAL PASSAGES FOR DIRECTING FLOW TOWARD THE IMPELLER VANES

CROSS REFERENCE TO RELATED APPLICATIONS

This application is a National Stage of International Application No. PCT/IB2017/050559 filed Feb. 2, 2017, claiming priority based on Italian Patent Application No. 102016000012017 filed Feb. 5, 2016.

BACKGROUND OF THE INVENTION

Field of the Invention

The present invention relates to a device for measuring the flow rate of a fluid, and in particular of a liquid, in a conduit, usable, for example, in the field of devices for household washing appliances, such as dishwashers and washing machines, and/or in the field of components for equipment for the production of foods, in particular, drinks.

More specifically, the invention relates to a device for measuring flow rate of the type comprising an impeller rotatably mounted in the conduit, around an axis which is substantially parallel to the axis of the conduit and having a plurality of vanes to be hit by a flow of said fluid to make the impeller rotate with an angular speed which is a function of the flow rate of said fluid, detector means associated with the impeller and arranged to provide electrical signals indicating the angular speed thereof, and a diffuser provided upstream of the impeller and defining a plurality of passages for dividing said flow into a plurality of reduced flows and directing the latter toward the vanes of the impeller, such as to make the impeller rotate in a predetermined direction.

Background

A flow measuring device of this type is described for example in European patent application EP 0 599 341 A2. In the solution described in that document, the impeller has a plurality of helical vanes and the associated diffuser also comprises a plurality of helical vanes, which are oriented in the opposite direction with respect to the vanes of the impeller.

The construction of impellers and diffusers provided with such helical vanes is relatively complex and expensive.

One object of the present invention is to provide a measuring device of the flow rate of a fluid and in particular a liquid, which has a simple structure that may be constructed in an easy and economical way and with a precise and reliable operation.

SUMMARY OF THE INVENTION

This and other objects are achieved according to the present invention with a flow measuring device of the above-defined type, characterized in that the impeller has a first axial portion close to the diffusor and provided with said vanes, which are substantially flat and lie in respective radial planes with respect to the aforementioned axis, and a second axial portion far from the diffuser and having a radial size greater than that of said first axial portion and to which said detector means are associated; and in that the diffuser forms a plurality of peripheral passages which extend in respective planes parallel to said axis and inclined in a same direction around said axis; each passage having a longitudinal inlet portion, at least approximately parallel to said axis and a transverse outlet portion laterally facing said first axial portion of the impeller in a manner such that in operation, the outlet portions of said passages of the diffuser direct towards the vanes of the impeller the corresponding flows of fluid in non-radial directions inclined in a same direction around said axis.

BRIEF DESCRIPTION OF THE DRAWINGS

Further features and advantages of the invention will become apparent from the detailed description that follows, provided by way of non-limiting example with reference to the accompanying drawings, in which.

DETAILED DESCRIPTION OF THE INVENTION

The drawings indicate collectively at 1 a measuring device of the flow rate of a fluid, in particular a liquid, according to the present invention.

Figure 1:
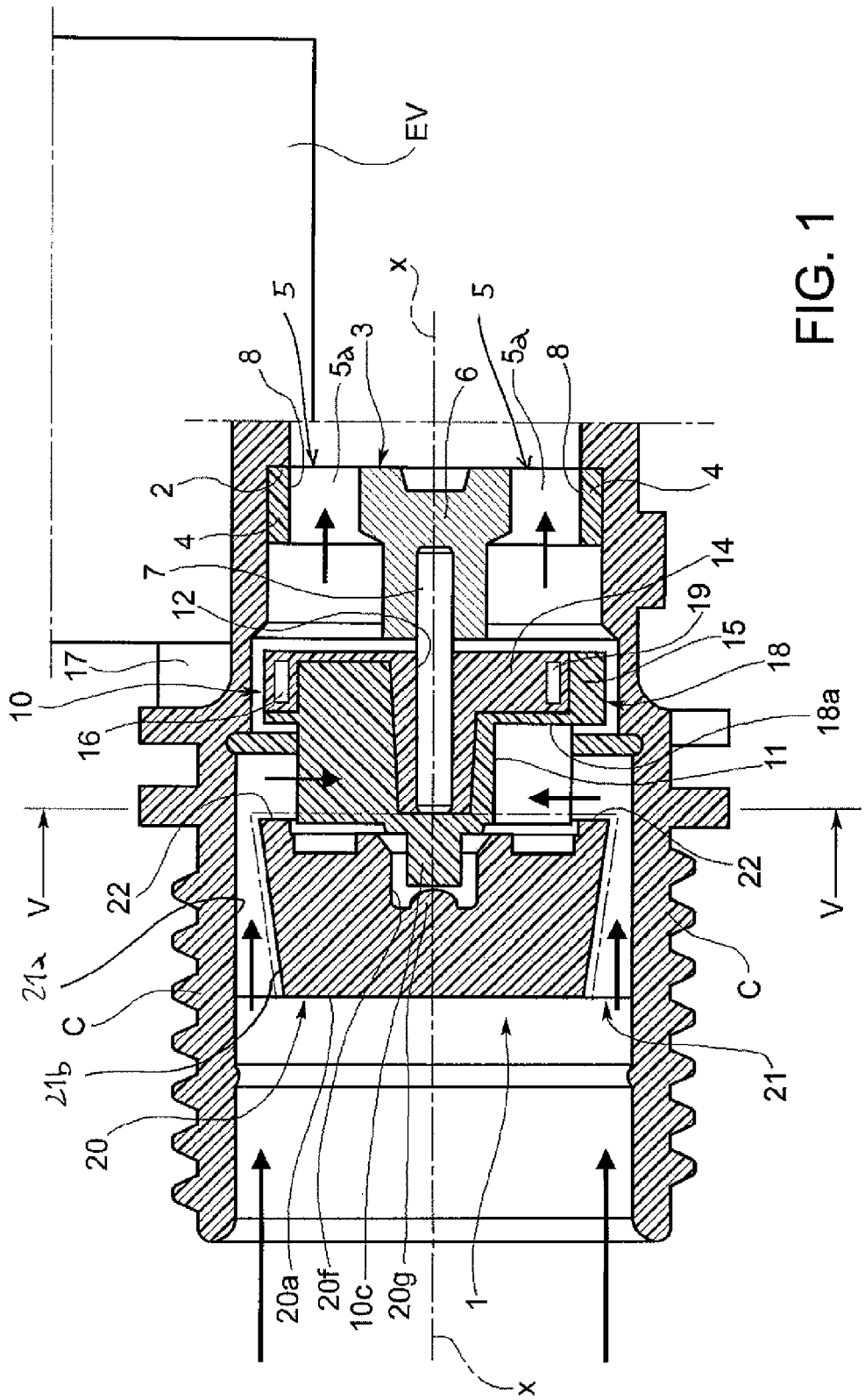
FIG. 1 is a sectional partial view of a measuring device of the flow rate of a fluid according to the present invention (the view being sectioned substantially on the line I-I of FIG. 5)

In FIG. 1, the flow measuring device 1 is shown mounted in a conduit or inlet connector C of an electric valve EV of a per se known type, for example an electric valve for loading water in the washing chamber of a washing machine or dishwasher. Such application/embodiment is, however, purely illustrative and not exhaustive of the scope of protection.

Figure 2:
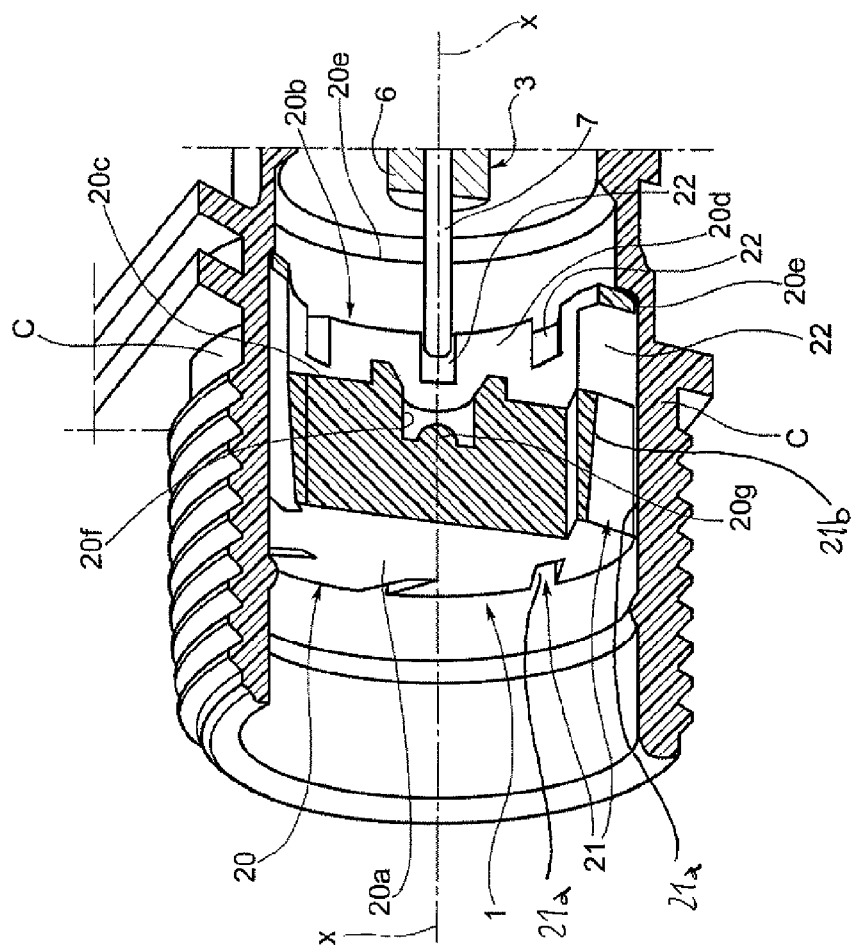
FIG. 2 is a partial perspective view, partially sectioned, of the flow measuring device according to FIG. 1.

In the embodiment illustrated in FIGS. 1 and 2, in the conduit C, downstream of the flow measuring device 1, a transverse shoulder 2 is defined, against which a support device, indicated collectively at 3, abuts. This device comprises a peripheral ring 4 connected by a plurality of spokes 5 to a central hub 6, in which an axial cavity is made wherein a support pin 7 is mounted. These spokes have lateral surfaces 5*a* parallel to the axis of the conduit C.

Between the spokes 5 of the support element 3, passages 8 are defined for the flow of liquid directed toward the electric valve EV. The lateral surfaces 5*a* parallel to the axis of the conduit C allow to straighten/linearize the output flow from the flow measuring device 1.

Figure 4:
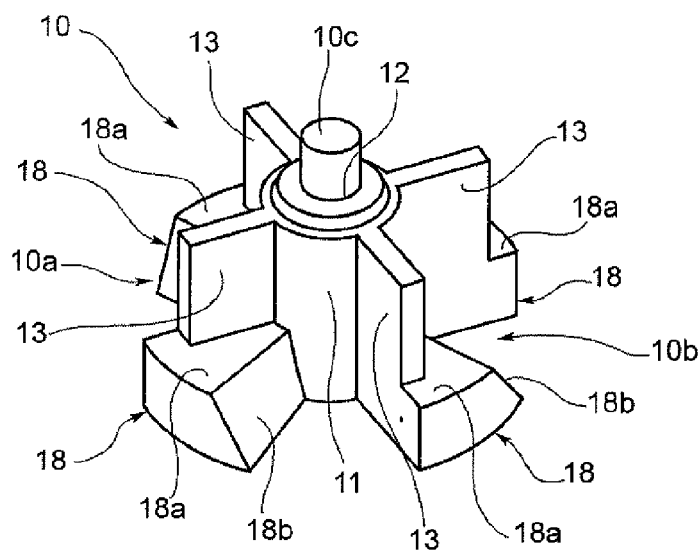
FIG. 4 is a perspective view of an impeller for use in a flow measuring device according to the invention.
Figure 5:
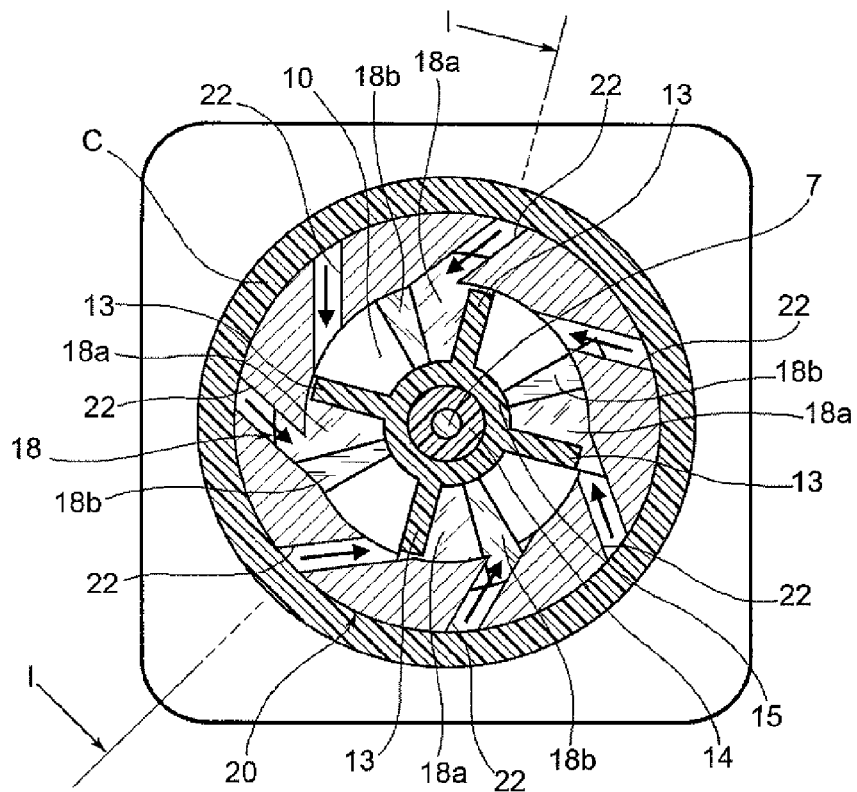
FIG. 5 is a sectional view substantially along the line V-V of FIG. 1.
Figure 6:
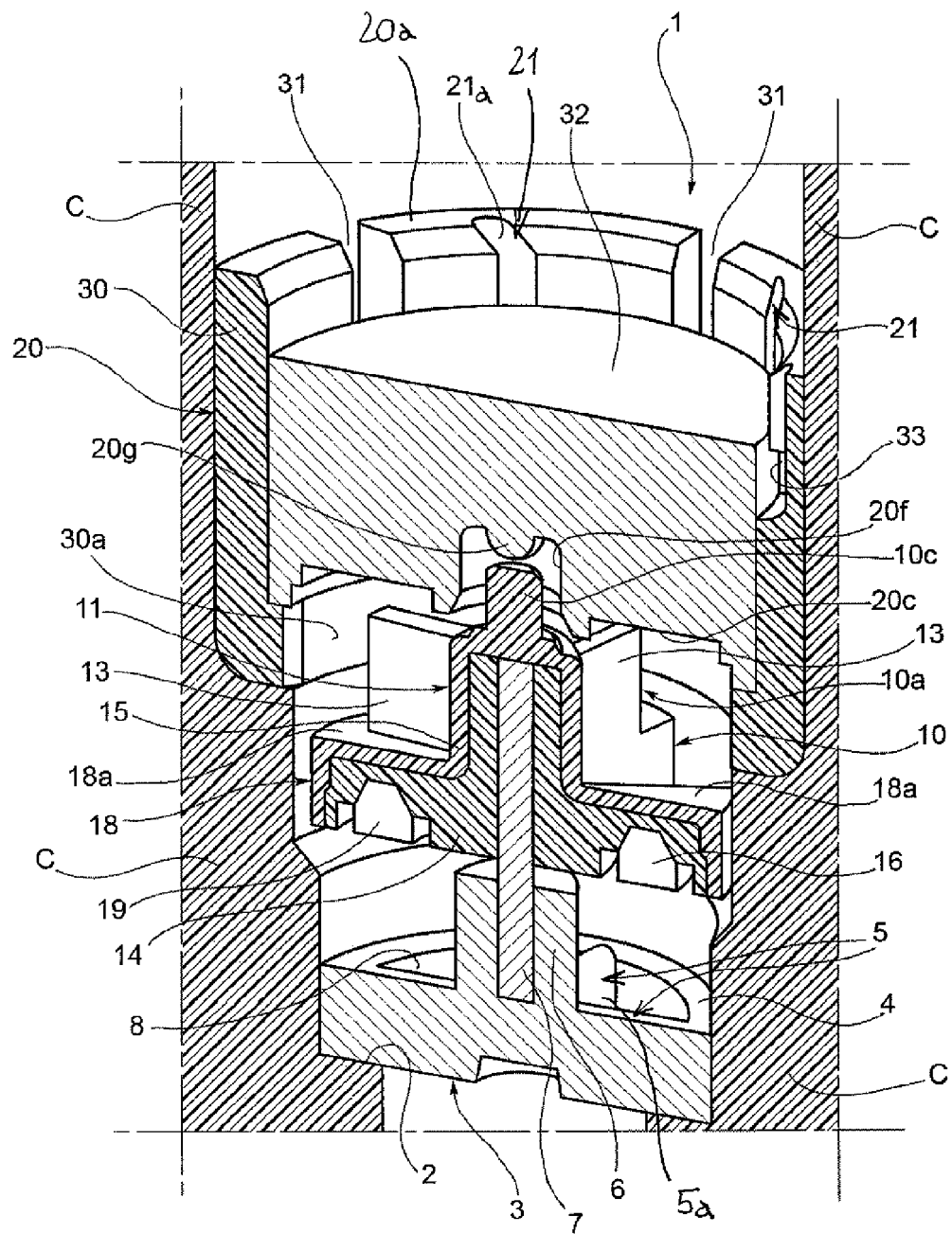
FIG. 6 is a partial view in axial section of another measuring device of the flow rate of a fluid according to the present invention.

The flow measuring device 1 also comprises an impeller indicated collectively at 10 in FIGS. 1, 4 and 5. An alternative embodiment of the impeller 10 is illustrated in FIG. 6, which will be described later.

In the embodiment according to FIGS. 1, 4 and 5, the impeller 10 comprises a central hub 11 in which an axial passage 12 is made, into which the rotary support pin 7 extends.

In a first axial portion 10a of the impeller 10 from the hub 11 a plurality of substantially flat vanes 13 extend radially, lying in planes passing through the axis of rotation X-X of the impeller 10 (FIG. 1). This axis is substantially parallel to the axis of the portion of the conduit C in which the flow measuring device 1 is mounted.

As will become clearer from the following, the vanes 13 of the impeller 10 are intended to be hit in operation by flows or jets of liquid flowing in the conduit C, in a manner such that said impeller 10 rotates with an angular velocity that is a function of the flow of liquid which passes through the conduit C.

As may be seen in FIGS. 1 and 5, in the exemplary embodiment illustrated, the impeller 10 is made with an inner body 14 in molded plastic material, on which is molded an outer body 14, also of plastic material.

It is moreover possible to make the impeller also of a single piece of plastic material.

In a manner known per se, at least one permanent magnet 16 is mounted or incorporated in a second axial portion 10b of the impeller 10 (FIG. 1). At least one mass 19 may be mounted on or incorporated into said second axial portion of the impeller 10, to achieve its dynamic balancing. The second axial portion 10b of the impeller 10 appropriately has radial dimensions greater than the first axial portion 10a.

To the impeller 10 is also associated a magnetic field detector device 17 (FIG. 1), adapted to detect the passage, in the vicinity of it, of the permanent magnet or magnets 16 and to correspondingly provide an electric signal, a characteristic of which (for example the frequency of pulses) is indicative of the angular speed of said impeller. This detector device 17 may comprise, for example, a Hall effect sensor.

As an alternative to the solution described above, the detection of the angular speed of the impeller 10 may be implemented by other means known per se, for example, by optical means.

With reference in particular to FIGS. 4 and 5, in the embodiment illustrated, to each radial vane 13 of the impeller 10 a respective molded end appendix 18 is connected in the second axial portion 10b of said impeller.

The end appendixes 18 of the impeller 10 have respective flat surfaces 18a that extend in a plane essentially orthogonal to the axis of the impeller 10 and which are connected to the corresponding radial surfaces 18b (see in particular FIG. 4), inclined to the same extent and in the same direction around the axis of the impeller 10.

The surfaces 18a and 18b form steps which extend circumferentially in the same direction, each from one flat radial vane 13 of the impeller towards the next flat radial vane 13.

As seen in FIG. 4, the end appendixes or projections 18 associated with the vanes 13 protrude radially beyond the flat radial vanes 13 whereby, as said above, the second axial portion 10b of the impeller 10 is radially larger than the first axial portion 10a.

The function of the end appendixes or projections 18 of the impeller 10 will be described below.

The flow measuring device 1 also comprises a diffuser indicated collectively at 20.

In the embodiment according to FIGS. 1 to 5, the diffuser 20 comprises a general body of substantially cylindrical shape, mounted in the conduit C immediately downstream of the impeller 10, in the vicinity of the first axial portion 10a of the latter, for example by pressfit.

Figure 3:
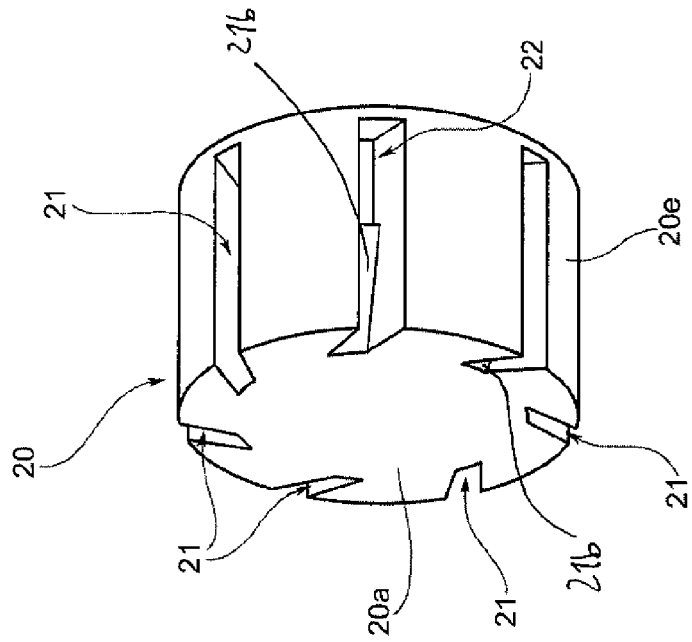
FIG. 3 is a perspective view of a diffuser comprised in the flow measuring device according to the preceding figures.

As best seen in FIGS. 2 and 3, the diffuser 20 has a plurality of peripheral longitudinal grooves 21, which extend toward the impeller 10 from the end surface 20a of the diffuser 20 facing the entrance of the conduit C.

On the side facing the impeller 10, the body of the diffuser 20 defines a central recess, indicated at 20b in FIG. 2 (where the impeller is not illustrated, to allow a better view of the structure of the diffuser 20). The recess 20b is defined between an inner transverse surface 20c of the diffuser and the annular inner surface 20d of the correspondingly annular wall 20e of the end of the diffuser 20 facing the impeller 10.

In the central part of the internal transverse wall 20c of the diffuser 20 a recess 20f is made, which extends into the axial end 10c of the impeller 10 facing the entrance of the conduit C (FIG. 1).

Appropriately, from the bottom transverse wall of the notch 20f of the diffuser 20 a protrusion 20g with a tapered shape extends toward the impeller 10 for example in the form of a spherical sector, which extends a short distance from the end 10c of said impeller 10, as seen in FIG. 1. The impeller 10 is appropriately mounted in an axially floating manner along the support pin 7, and the protrusion 20g of the diffuser 10 allows, within predetermined limits, the extent of its axial movements to be maintained. Advantageously, this solution allows for the reduction of friction and wear.

The grooves 21 of the diffuser 20 combine to define, as will appear more clearly from the following, a corresponding plurality of passages adapted to place in communication the region upstream of such diffuser with the downstream region, in which is located the impeller 10, and appropriately direct the liquid flow at least partially towards the first axial portion 10a of the impeller 10 and in particular toward the flat radial vanes 13. In particular, each longitudinal groove 21 defines an inlet portion of the respective passage, which is delimited between a radially outer solid surface 21a formed on the conduit C and a radially inner solid surface 21b formed on the diffuser 20.

In the illustrated embodiment, the grooves 21 of the diffuser 20 extend in respective planes parallel to the axis X-X of rotation of the impeller 10, which also represents the longitudinal axis of such diffuser 20. In particular, the grooves 21 extend in respective planes that are inclined in the same direction around said axis X-X (see FIGS. 2 and 3).

As seen in FIGS. 2, 3 and 5, the longitudinal grooves 21 extend near the end of the diffuser 20 facing the impeller 10, near which they connect with each other via corresponding transverse passages 22, coplanar to them respectively. Each transverse passage 22 is delimited on the radially outer side from the radially outer solid surface 21a formed on the conduit C, and in the axial direction between opposing solid surfaces formed on the diffuser 20.

As may be seen in particular in FIG. 5, the transverse passages 22 are directed substantially along non-radial directions, inclined in a same direction around the axis of the impeller 10.

As seen for example in FIG. 2, preferably the grooves 21 of the diffuser 20 do not have a uniform depth, but their cross-section is reduced gradually in the direction of the associated passages 22, to speed the flow of the fluid which passes through them.

By effect of the presence of the diffuser 20, the flow of liquid, which in operation enters the conduit C, is divided into a plurality of reduced flows, which propagate axially in the grooves 21 and tangentially in the transverse passages 22 of such diffuser.

The transverse passages 22 therefore emit nearly tangential flows or jets that at least partially hit the flat radial vanes 13 of the portion 10a of the impeller 10, as may be appreciated by observing in particular FIGS. 1 and 5.

The total liquid flow that hits the impeller 10 passes over the latter, through the gaps defined between consecutive pairs of vanes 13 and propagates finally through the openings 8 of the support device 3 (FIG. 1), in the direction of a user device, such as the electric valve EV of FIG. 1.

The end appendixes 18 of the second axial portion 10b of the impeller 10 confer overall to the vanes of the same a configuration essentially in the form of an L, which allows the risks of cavitation to be reduced and the turbulence to be mitigated.

Figure 7:
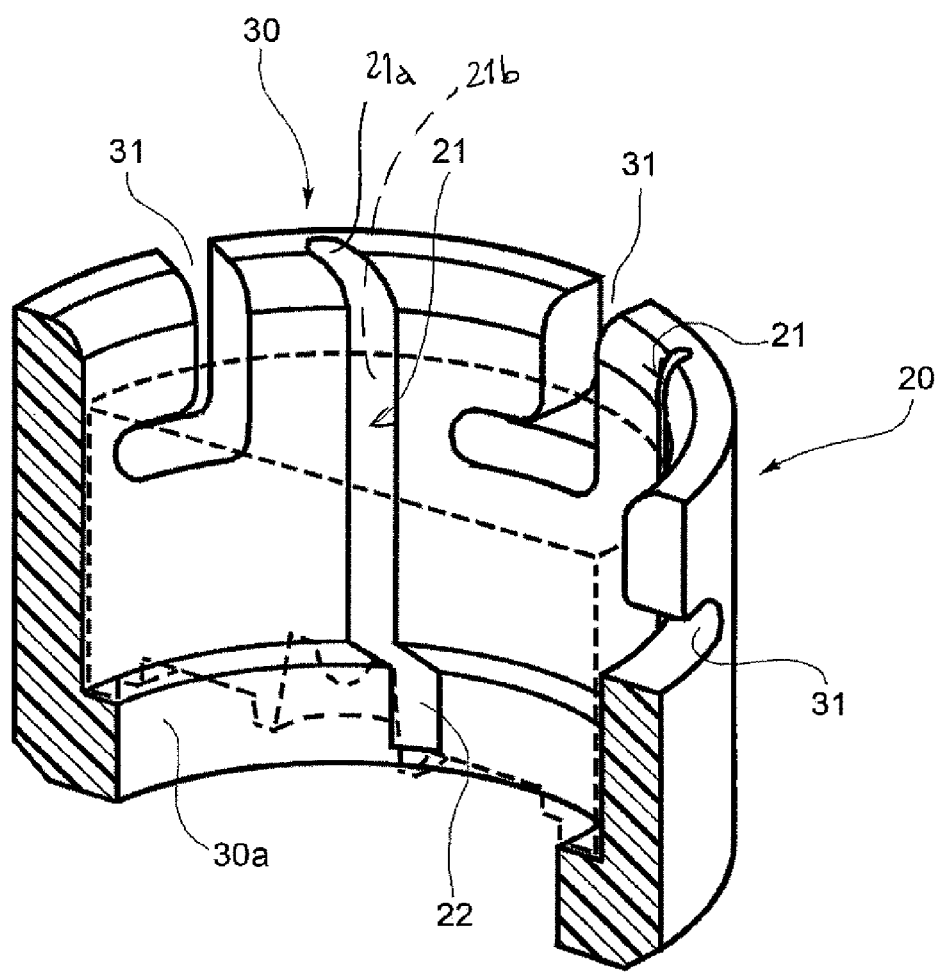
FIG. 7 is a sectional perspective view of a diffuser comprised in the flow measuring device according to FIG. 6.

FIGS. 6 and 7 show a variant of embodiment. In these figures, parts and elements identical or functionally corresponding to parts and elements already described have again been attributed the same alphanumeric references used previously.

In the variant according to FIGS. 6 and 7, the diffuser 20 comprises an essentially annular/tubular body 30, that, on the side facing the inlet of the liquid, has a series of essentially L-shaped notches 31, the function of which will be described later.

Between the L-shaped notches 31 in the body wall 30, longitudinal grooves 21 are made, functionally similar to the grooves 21 of the diffuser according to the embodiment of FIGS. 1 to 5.

The body 30, on the side facing the impeller 10, has a thickening 30a (FIG. 7) of its wall, which protrudes radially towards its axis.

The grooves 21 are connected with corresponding transverse passages 22, similar to the analogous transverse passages 22 of the diffuser according to FIGS. 1 to 3.

Also in the embodiment according to FIGS. 6 and 7, the grooves 21 and the passages 22 will extend appropriately in respective planes parallel to the axis of the diffuser of the impeller and inclined in a same direction around such axis.

In the embodiment according to FIGS. 6 and 7, a plug-like closing body 32, externally provided with protrusions 33, is inserted into the body 30, with bayonet coupling of such protrusions 33 in the L-shaped notches 31 of said body 30.

The plug-like closing body 32 has a reduced axial extension compared to the body 30 and abuts the thickened portion 30a of this body.

In this embodiment, the body 30 and the plug-like closing body 32 of the diffuser 20 combine to define the passages for the flow of fluid.

In particular, each longitudinal groove 21 defines an inlet portion of the respective passage, which is delimited between a radially outer solid surface 21a formed on the body 30 of the diffuser 20 and a radially inner solid surface 21b formed on the plug-like closing body 32 of the diffuser 20.

Each transverse passage 22 is delimited on the radially outer side from the radially outer solid surface 21a formed on the body 30, and in the axial direction between opposing solid surfaces formed on the body 30 and on the plug-like closing body 32 of the diffuser 20.

In the lower side of the plug-like closing body 32 (FIG. 6) the recess 20f is appropriately made, with the associated protrusion 20g, intended to limit the axial movement of the impeller 10 relative to the rotary support pin 7.

For the rest, the embodiment according to FIGS. 6 and 7 corresponds, also functionally, to the embodiment illustrated previously with reference to FIGS. 1 to 5.

In relation to the version according to FIGS. 6 and 7, it is again noted that the body 30 may possibly be made integral, that is in one piece, with the conduit C.

Naturally, without altering the principle of the invention, the embodiments and the details of construction may vary widely with respect to those described and illustrated purely by way of non-limiting example, without thereby departing from the scope of the invention as defined in the appended claims.

The invention claimed is:

1. A device for measuring the flow rate of a fluid, comprising
   an impeller rotatably mounted in said conduit, around an axis which is substantially parallel to the axis of the conduit, and having a plurality of radial vanes to be hit by a flow of said fluid for making the impeller rotate with an angular speed which is a function of the flow rate of said fluid, and
   a detector associated with the impeller and arranged to provide electrical signals indicating the angular speed thereof;
   upstream of the impeller there being provided a diffuser defining a plurality of passages for receiving a flow of said fluid directed along the axis of the conduit and dividing said flow into a plurality of reduced flows and directing said reduced flows toward the vanes of the impeller, such as to make the latter rotate in a predetermined direction;
   wherein the impeller has
   a first axial portion close to the diffusor diffuser and provided with said vanes, which are substantially flat and lie in respective radial planes with respect to said axis, and
   a second axial portion which is remote from the diffuser and has a radial size greater than that of said first axial portion, and with which said detector is associated; and
   wherein the diffuser defines a plurality of peripheral passages which extend in respective planes parallel to said axis and inclined in a same direction around said axis; each passage having a longitudinal inlet portion, at least approximately parallel with said axis and a transverse outlet portion laterally facing said first axial portion of the impeller such that in the operation the outlet portions of said passages direct towards the vanes of the impeller corresponding flows or jets of fluid in non-radial directions inclined in a same sense about said axis.

2. The device according to claim 1, wherein each passage is defined by a radially outer solid surface formed on the diffuser or on the conduit, and wherein the longitudinal inlet portion of each outlet passage is furthermore delimited by a radially inner solid surface formed on the diffuser, in such a way that each reduced flow propagates axially in the longitudinal inlet portion of the respective passage, and tangentially in the longitudinal outlet portion of the respective passage.

3. The device according to claim 1, wherein the longitudinal inlet portions of said passages of the diffuser have a cross-section which tapers towards the associated transverse outlet portions of said passages.

4. The device according to claim 1, wherein said longitudinal inlet portions of the passages of the diffuser are formed as peripheral grooves of said diffuser.

5. The device according to claim 1, wherein the diffuser comprises an annular body intended to be fixed in the conduit in a position upstream of the impeller, and wherein said peripheral passages of the diffuser are provided in the internal surface of said annular body.

6. The device according to claim 5, wherein in said annular body there is fixed a plug-like closing body.

7. The device according to claim 1, wherein in said second axial portion of the impeller with the vanes join respective step-like end appendixes or projections which protrude circumferentially in a same sense, each one from a radial vane towards an adjacent radial vane.

8. The device according to claim 7, wherein said end appendixes or projections of the impeller have respective coplanar flat surfaces lying in planes which are essentially orthogonal to the axis of the impeller and which adjoin corresponding inclined radial surfaces slanted in a same sense with respect to the axis of the impeller.

9. The device according to claim 7, wherein said appendixes or projections of the impeller protrude radially beyond the corresponding radial vanes of the impeller.

10. The device according to claim 7, wherein said detector includes at least one permanent magnet carried by one of the appendixes or projections of the impeller.

11. The device according to claim 1, further comprising a support arranged downstream of the impeller and comprising a plurality of spokes having side surfaces parallel to the axis of the conduit, between which are defined passages for the flow of fluid.

\* \* \* \* \*